US 6,735,967 B1

(12) United States Patent
Bischel et al.

(10) Patent No.: US 6,735,967 B1
(45) Date of Patent: May 18, 2004

(54) HEAT TREAT HOT GAS SYSTEM

(75) Inventors: Kevin Bischel, Rockton, IL (US);
Kenneth Moshier, Roscoe, IL (US);
Martin Singletary, Beloit, WI (US);
Robert K. Newton, Beloit, WI (US);
Peter McNamee, Beloit, WI (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 0 days.

(21) Appl. No.: 10/278,418

(22) Filed: Oct. 23, 2002

(51) Int. Cl.[7] .......................... F25B 41/00; F25B 27/00
(52) U.S. Cl. ..................... 62/196.4; 62/238.6
(58) Field of Search .................. 62/196.4, 238.6, 62/342, 331

(56) References Cited

U.S. PATENT DOCUMENTS

| 4,476,146 | A | | 10/1984 | Manfroni | |
|---|---|---|---|---|---|
| 6,490,872 | B1 | * | 12/2002 | Beck et al. | 62/66 |
| 6,494,055 | B1 | * | 12/2002 | Meserole et al. | 62/342 |
| 6,553,779 | B1 | * | 4/2003 | Boyer et al. | 62/342 |

FOREIGN PATENT DOCUMENTS

| EP | 0059330 | A2 | 9/1982 |
| EP | 0059330 | B1 | 9/1982 |
| EP | 0769251 | | 4/1997 |

* cited by examiner

Primary Examiner—Melvin Jones
(74) Attorney, Agent, or Firm—Carlson, Gaskey & Olds

(57) ABSTRACT

A hot gas heat treat system is employed to cool mix in a hopper and a freezing cylinder and to heat the mix for pasteurization. A hopper liquid line solenoid valve at the inlet of the hopper and a cylinder liquid line solenoid valve at the inlet of the freezing cylinder each control the flow of refrigerant to the expansion valves which further control the flow of refrigerant that flows around the hopper and the freezing cylinder, respectively. A hopper hot gas solenoid valve at the inlet of the hopper and a cylinder hot gas solenoid valve at the inlet of the freezing cylinder control the flow of refrigerant from the compressor that flows around the hopper and the freezing cylinder. The system further includes a hot gas bypass valve that is opened when only the hopper is being cooled to provide additional load to the compressor. An EPR valve is positioned proximate to the hopper discharge to vary the temperature of the refrigerant exchanging heat with the hopper. A CPR valve is employed to control the inlet pressure of the compressor by reducing the amount of hot refrigerant flowing into the compressor suction. The system further includes a TREV valve to allow for liquid refrigerant injection to the compressor suction to control excessive compressor discharge during the cool cycle.

25 Claims, 2 Drawing Sheets

HEAT TREAT HOT GAS SYSTEM

BACKGROUND OF THE INVENTION

The present invention relates generally to a refrigeration system used in a frozen dessert system that includes a hopper heat exchanger and a cylinder heat exchanger that each contain a frozen dessert mix and have a respective expansion device, and a valve is positioned between each of the respective expansion devices and a heat rejecting heat exchanger to control a flow of refrigerant from the heat rejecting heat exchanger and into the hopper heat exchanger and the cylinder heat exchanger.

A refrigeration system is employed to cool a mix in a frozen dessert system. The frozen dessert system typically includes a hopper which stores the mix and a freezing cylinder that cools and mixes air into the mix prior to serving. The freezing cylinder is cooled by a refrigeration system. Refrigerant is compressed in a compressor to a high pressure and high enthalpy. The refrigerant then flows through a condenser where the refrigerant rejects heat and is cooled. The high pressure low enthalpy refrigerant is then expanded to a low pressure. After expansion, the refrigerant flows through the tubing encircling the freezing cylinder, accepting heat from and cooling the freezing cylinder, and therefore the mix. After cooling the freezing cylinder, the refrigerant is at a low pressure and high enthalpy and returns to the compressor for compression, completing the cycle.

The hopper is cooled by a separate glycol system that wraps around the hopper and the freezing cylinder. The glycol that flows around the freezing cylinder is cooled by the freezing cylinder. The cooled glycol then flows around the hopper to cool the mix in the hopper. To meet food safety standards, the mix in the hopper must be kept below 41° F.

The mix is also pasteurized every night to kill any bacteria. The mix is heated for approximately 90 minutes to obtain a temperature of at least 150° F. The mix is kept over 150° F. for 30 minutes, and then cooled back to 41° F. within 120 minutes. The mix is heated by heating the glycol with an electrical heater. As the heated glycol flows around the hopper and the freezing cylinder, the heat in the glycol is transferred to the freezing cylinder and the hopper, warming the mix.

A drawback to this system is that both the freezing cylinder and the hopper are coupled by the glycol system. During cooling, when the cooled glycol flows around and exchanges heat with the hopper, the glycol is heated by the hopper. When the glycol later flows around the freezing cylinder again, the heat in the glycol heats the freezing cylinder, melting the mix in the freezing cylinder.

Additionally, during heating, the glycol first flows around and heats the freezing cylinder. As the glycol rejects heat to the freezing cylinder, the glycol is cooled. When this glycol flows around the hopper, it is less effective in heating the hopper as the glycol has already been cooled by the freezing cylinder. Therefore, it takes longer to heat the hopper, resulting in a long pasteurization cycle which requires over three hours to complete. As the pasteurization cycle changes the flavor of the mix, a longer pasteurization cycle can affect the flavor of the frozen dessert.

Hot gas heating systems have been used in the prior art, but did not allow for individual control of the cooling of the hopper and the cylinder. Therefore, both the hopper and cylinder were cooled at the same time and could not be cooled separately. If only one of the hopper and the freezing cylinder required cooling, the other would have to be cooled as well. As the suction lines of the hopper and the freezing cylinder of the prior art are also not de-coupled, it is difficult to vary the pressure, and hence the temperature, of the refrigerant in the hopper and the freezing cylinder. To achieve the best dessert product quality, it is desirable to have the refrigerant cooling the mix in the hopper be at a different temperature and pressure than the refrigerant freezing the mix in the freezing cylinder. Another drawback of the prior art hot gas system is also that there is a low system capacity as an undersized compressor is employed to attain compressor reliability.

SUMMARY OF THE INVENTION

The hot gas heat treat system of the present invention includes a hopper which stores mix for making a frozen product. The mix flows from the hopper into a freezing cylinder for cooling and mixing with air. The refrigerant is compressed in a compressor and then cooled by a condenser and changes to a liquid. The refrigerant is then split into two paths, one flowing to the freezing cylinder and one flowing to the hopper. The refrigerant flowing to the freezing cylinder is expanded to a low pressure by an AXV expansion valve and then accepts heat from the freezing cylinder to cool the mix in the freezing cylinder. The refrigerant flowing to the hopper is expanded to a low pressure by a TXV expansion valve and then accepts heat from the hopper to cool the mix in the hopper. The refrigerant flowing to the hopper is between 22° and 24° F to keep the mix in the hopper between 37° and 39° F. After cooling the freezing cylinder and the hopper, the refrigerant is at a low pressure and high enthalpy and returns to the compressor for compression.

A liquid line solenoid valve is positioned at the inlet of each of the hopper and the freezing cylinder to control the flow of cool high pressure liquid refrigerant from the condenser to the hopper and the freezing cylinder. A hot gas solenoid valve is positioned at each of the inlet of the hopper and the freezing cylinder to control flow of hot gaseous refrigerant from the compressor discharge to the hopper and the freezing cylinder. When the system is in the cooling mode, the liquid line solenoid valves are opened and the hot gas solenoid valves are closed to allow the flow of high pressure liquid refrigerant to cool the mix in the hopper and the freezing cylinder. When the system is in the heating mode for nightly repasteurization, both the hot gas solenoid valves are opened and the liquid line solenoid valves are closed to allow the hot gaseous refrigerant to warm the mix in the hopper and the freezing cylinder.

When only the hopper is being cooled, not enough load is provided on the compressor, affecting compressor reliability. A hot gas bypass valve is opened to allow refrigerant gas from the compressor discharge to flow to the compressor suction to increase compressor load. Preferably, a solenoid valve is employed in series with the hot gas bypass valve to prevent leakage of refrigerant through the hot gas bypass valve.

An EPR valve is positioned proximate to the hopper discharge to maintain the evaporator pressure of the hopper, and therefore the temperature of the refrigerant flowing through the hopper. A CPR valve limits the inlet pressure of the compressor by reducing the amount of refrigerant flowing into the compressor suction. A solenoid valve proximate to the discharge of the freezing cylinder is closed when the freezing cylinder is not being cooled to prevent warm refrigerant from migrating around the freezing cylinder.

The system further includes a TREV valve to allow for liquid refrigerant injection to the compressor suction to control excessive compressor discharge during the cool cycle. When the compressor discharge temperature approaches 230° F., the TREV valve is opened to allow the high pressure liquid refrigerant from the condenser to flow into the compressor suction, cooling the compressor suction and therefore the compressor discharge.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
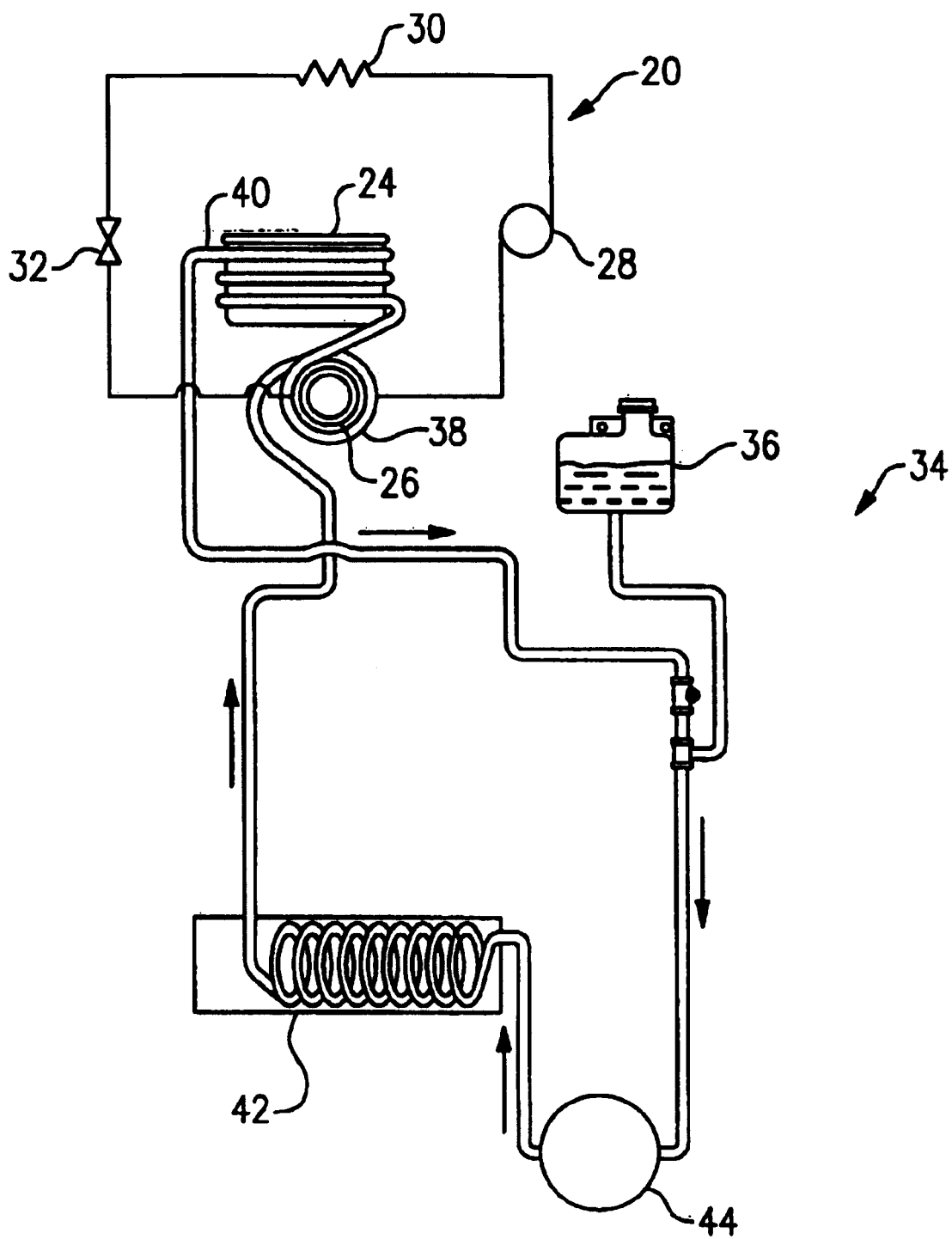
FIG. 1 schematically illustrates a prior art heat treat system employing glycol as the refrigerant.

FIG. 1 schematically illustrates the prior art heat treat system. The system includes a hopper 24 which stores a mix and a freezing cylinder 26 that cools and mixes air into the mix prior to serving. The freezing cylinder 26 is cooled by a refrigeration system 20. Refrigerant is compressed in a compressor 28 to a high pressure and high enthalpy. The refrigerant then flows through a condenser 30 where the refrigerant rejects heat and is cooled. The high pressure low enthalpy refrigerant is then expanded to a low pressure in an expansion device 32. After expansion, the refrigerant flows through the tubing encircling the freezing cylinder, accepting heat from and cooling the freezing cylinder 26, and therefore the mix. After cooling the freezing cylinder 26, the refrigerant is at a low pressure and high enthalpy and returns to the compressor 28 for compression, completing the cycle.

The hopper 24 is cooled by a separate glycol system 34. A pump 44 pumps the glycol through the glycol system 34. The glycol from a glycol tank 36 enters the glycol system 34 and flows through a refrigeration line 38 wrapped around the freezing cylinder 26 and is cooled. The cooled glycol then flows around the refrigeration line 40 around the hopper 24, cooling the mix in the hopper 24.

When the mix is to be pasteurized, a heater 42 heats the glycol. The heated glycol first flows in the refrigeration line 38 wrapped around the freezing cylinder 26 and heats the mix in the freezing cylinder 26, cooling the glycol. The cooled glycol then flows in the refrigeration line 40 wrapped around the hopper 24 and heat the mix in the hopper 24. The glycol is less effecting in heating the hopper 24 as the glycol has already been cooled by the freezing cylinder 26. Therefore, it takes longer to heat the hopper 24 and complete the heating process of the mix.

Figure 2:
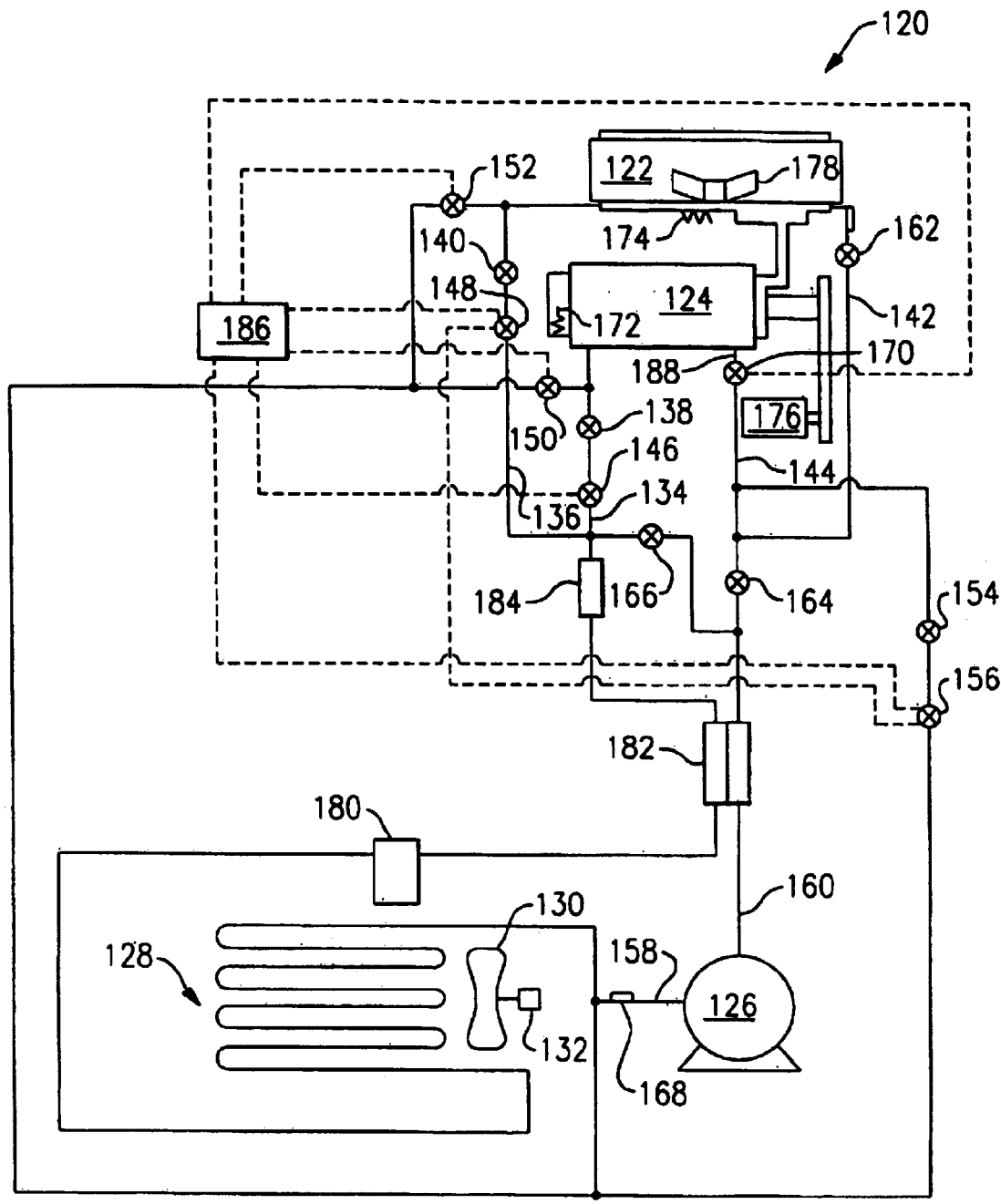
FIG. 2 schematically illustrates the hot gas heat treat system of the present invention.

FIG. 2 schematically illustrates the hot gas heat treat system 120 of the present invention. The system 120 includes a hopper 122 which stores mix for making a frozen product. In one example, the hopper 122 is a 20 quart hopper. The mix flows from the hopper 122 into a freezing cylinder 124 for freezing and mixing with air. In gravity fed systems, a standard air-mix feed tube is used to meter the air into the freezing cylinder 124. In pump systems, air is metered into the freezing cylinder 124 by a pump. Preferably, the freezing cylinder 124 is a stainless steel freezing cylinder. The frozen product is then dispensed for serving.

The hopper 122 and the freezing cylinder 124 are cooled by a refrigeration system. Refrigerant flows through the closed circuit system. In one example, the refrigerant is R404A. The hot gas refrigerant is compressed in the compressor 126 to a high pressure and high enthalpy. The refrigerant then flows through a condenser 128 where the refrigerant rejects heat and is cooled by a fan 130 driven by a motor 132. In one example, the condenser 128 is a three row 5/16 inch tube and raised lanced fin condenser 128. The condenser 128 can also be a water cooled condenser or an air cooled condenser. However, it is to be understood that other types of condensers 128 can be employed. Due to the high refrigeration loads during the heat cycle, the capacity of the condenser 128 must be increased versus similar capacity non-heat treat configurations. Additionally, the size of the compressor 126 and the size of the condenser 128 are balanced and related to each other.

The high pressure low enthalpy refrigerant is then expanded. Prior to expansion, the refrigerant flow path is split into two paths 134 and 136. One path 134 leads to the freezing cylinder 124 and one path 136 leads to the hopper 122.

The refrigerant flowing through path 134 to cool the mix in the freezing cylinder 124 passes through an expansion valve 138 and is expanded to a low pressure. Preferably, the expansion valve 138 is an AXV expansion valve. An AXV expansion valve is an automatic expansion valve that constantly regulates pressure to control the evaporating pressure of the refrigerant flowing around the freezing cylinder 124 at −15° F., allowing for consistent product quality. This is important as the mix in the freezing cylinder 124 is sensitive to the fixed evaporator temperature. The cooling of the mix in the freezing cylinder 124 commonly takes less time than the cooling of the mix in the hopper 122. Although an AXV expansion valve has been described, it is to be understood that other types of expansion valve can be employed.

After expansion, the refrigerant flows through the tubing encircling the freezing cylinder 124, accepting heat from and cooling the freezing cylinder 124, and therefore the mix. The refrigerant exits the tubing around the freezing cylinder 124 through path 144. Although tubing has been described, it is to be understood that the refrigerant can flow through a chamber that is proximate to the freezing cylinder 124.

The refrigerant flowing through path 136 to cool the mix in the hopper 122 passes through an expansion valve 140 and is expanded to a low pressure. Preferably, the expansion valve 140 is a TXV expansion valve. A TXV expansion valve, or thermal expansion valve, has a higher capacity for heat removal. The refrigeration capacity required to cool the hopper 122 varies and is proportional to the mix level in the hopper 122. The TXV valve provides control of the refrigerant massflow to the hopper 122 and maintains the set amount of superheat to assure compressor 126 reliability.

After expansion, the refrigerant flows through tubing encircling the hopper 122, accepting heat from and cooling the hopper 122, and therefore the mix. In one example, the tubing encircling the hopper 122 is a copper tube refrigeration line wrapped around and soldered to the bottom and the walls of the hopper 122 having a diameter of approximately 5/16 of an inch in diameter. However, other diameters of tubing can be employed. The surface area of the refrigeration line soldered to the bottom of the hopper 122 is preferably maximized. The refrigerant that cools the mix in the hopper 122 is between 22° and 24° F., keeping the mix in the hopper 122 between 37° and 39° F., below the standard of 41° F. The refrigerant exits the hopper 122 through path 142.

After cooling the freezing cylinder 124 and the hopper 122, the refrigerant is at a low pressure and high enthalpy. The refrigerant paths 142 and 144 merge and the refrigerant returns to the compressor 126 for compression, completing the cycle.

The system 120 further includes a receiver 180 that stores excess refrigerant and helps to control the variable amount of free refrigerant in the system 120. A heat exchanger/subcooler 182 is employed to exchange heat between the gaseous refrigerant from the freezing cylinder 124 and the liquid refrigerant flowing to the expansion valves 138 and 140 to further increase capacity. The heat exchanger/subcooler 182 is employed to warm the suction gas into the compressor 126, ensuring that only gaseous refrigerant, and not liquid refrigerant, enters the compressor 126, increasing compressor 126 life. A filter/dryer 184 is employed to trap any debris in the refrigerant and to remove any water which may have leaked into the refrigerant.

The system 120 further includes two liquid line solenoid valves 146 and 148. The liquid line solenoid valve 146 controls the flow of cool refrigerant from the condenser 128 and to the freezing cylinder 124, and the liquid line solenoid valve 148 controls the flow of cool refrigerant from the condenser 128 and to the hopper 122. When the system is in the cooling mode and both the freezing cylinder 124 and the hopper 122 are cooled, both the liquid line solenoid valves 146 and 148 are opened to allow the cooled refrigerant to flow around freezing cylinder 124 and the hopper 122. During cooling, the hot gas solenoid valves 150 and 152 (explained below) are closed.

When the heat cycle begins for pasteurization, the liquid line solenoid valves 146 and 148 are closed, preventing cooled refrigerant from flowing to the hopper 122 and the freezing cylinder 124. The system 120 further includes two hot gas solenoid valves 150 and 152. The hot gas solenoid valve 150 is positioned between the compressor discharge 158 and the freezing cylinder 124, and the hot gas solenoid valve 152 is positioned between the compressor discharge 158 and the hopper 122. When the mix is to be heated, the two hot gas solenoid valves 150 and 152 are opened to allow hot gas from the compressor discharge 158 to flow around the freezing cylinder 124 and the freezing cylinder 122 bypassing the condenser 128. When the system is in heating mode and both the freezing cylinder 124 and the hopper 122 are heated, both the liquid line solenoid valves 146 and 148 are closed.

The mix is heated to at least 150° F. for at least 30 minutes every night to repasteurize the mix and kill any bacteria. As the refrigeration line is soldered to both the bottom and the walls of the hopper 122, baking of the mix on the hopper 122 walls is reduced as the heat is transferred to a larger surface area of the hopper 122. Baking of the mix is caused by a mix film foam that clings to the walls of the hopper 122 as the mix level drops. As the hopper 122 and the freezing cylinder 124 are heated separately, the mix can be cooled faster and the mix can be heated to 150° faster, reducing the time of the pasteurization cycle and therefore reduce the disfavoring of mix.

During the heating mode, it may be preferable to open the hot gas solenoid valve 152 to heat the hopper 122 alone for a few minutes prior to the opening of the hot gas solenoid valve 150 and heating the freezing cylinder 124 to prevent compressor 126 flood back. Each hot gas solenoid valve 150 and 152 is de-energized asynchronously so that the valves 150 and 152 are controlled separately. Temperature feedback is provided from both the hopper 122 and the freezing cylinder 124 by temperature sensors 174 and 172, respectively, to indicate when the mix has reached the desired temperature. The temperatures of the mix in the hopper 122 and the freezing cylinder 124 are provided to a control (not shown) which controls the system 120.

The liquid line solenoid valves 146 and 148 and the hot gas solenoid valves 150 and 152 are controlled separately by a control 186. Therefore, during cooling, the hopper 122 and the freezing cylinder 124 can be separately cooled and during heat, the hopper 122 and the freezing cylinder 124 can be separately heated.

When only the hopper 122 is being cooled during the cooling mode, the cooling of the hopper 122 alone may not provide enough load on the compressor 126 and the compressor 126 suction pressure droops, affecting compressor reliability. When only the hopper 122 is being cooled, the liquid line solenoid valve 146 leading to the freezing cylinder 124 is closed, and the liquid line solenoid valve 148 leading to the hopper 122 is opened. A hot gas bypass valve 154 may open to allow hot refrigerant from the compressor discharge 158 to flow into the compressor suction 160, applying extra load to the compressor 126 when only the hopper 122 is being cooled. The hot gas bypass valve 154 is self-regulated. The refrigerant gas is diverted from performing any refrigerant effect, but provides a load to the compressor 126 to maintain the compressor 126 suction pressure above 15 psig.

At all other times, the hot gas bypass valve 154 is closed. However, it is possible that the hot gas bypass valve 154 may not completely close, resulting in an undesirable leak of refrigerant into the system 120. In one example, a hot gas bypass solenoid valve 156 is employed in series with the hot gas bypass valve 154 to prevent the undesirable leakage of refrigerant from the compressor discharge 158 into the system 120. The hot gas bypass solenoid valve 156 is activated in parallel with the liquid line solenoid valve 148 so that the solenoid valve 156 only opens when the liquid line solenoid valve 148 is opened. However, it is to be understood that the hot gas bypass solenoid valve 156 can be activated by the control 186. When the control 186 determines that the liquid line solenoid valve 148 for the hopper 122 is opened and the liquid line solenoid valve 146 for the freezing cylinder 124 is closed, indicating that the hopper 122 alone is being cooled, the hot gas bypass solenoid valve 156 is also opened with the hot gas bypass valve 154 to provide additional load on the compressor 126. At all other times, the hot gas bypass solenoid valve 156 is closed, preventing the leakage of refrigerant from the compressor 126 discharge into the system 120. It is to be understood that the hot gas bypass valve 154 and the hot gas bypass solenoid valve 156 can be employed either alone or together.

The system 120 further includes an evaporator pressure regulator valve, or an EPR valve 162, positioned proximate to the discharge of the hopper 122. The EPR valve 162 is self-regulated. As the refrigerant exchanging heat with the hopper 122 and the freezing cylinder 124 both originate from the compressor 126, the temperature of the refrigerant is set by the suction pressure of the compressor 126 and is not adjustable. However, the refrigerant flowing around the hopper 122 needs to be between 22° to 24° F. to cool the mix in the hopper 122 to 37° to 39° F., and the refrigerant flowing around the freezing cylinder 124 needs to be about −15° F. to cool the mix in the freezing cylinder 124 to 20° F. The EPR valve 162 is employed to maintain the pressure of the refrigerant exchanging heat with the hopper 122 at 60 psig. As the pressure of the refrigerant exchanging heat with the hopper 122 is maintained at 60 psig, the temperature of the refrigerant flowing around the hopper 122 is maintained at a desired temperature. Preferably, the refrigerant flowing around the hopper 122 is maintained between 22° to 24° F.

A crankcase pressure regulator valve, or CPR valve 164, is employed to control the inlet pressure of the compressor 126 and to maintain the compressor suction pressure below 40 psig. The CPR valve 164 is also self-regulated. If the compressor suction pressure increased above 40 psig, the compressor 126 can stall. When the CPR valve 164 is throttled or restricted, the amount of hot refrigerant flowing into the compressor suction 160 is decreased. By decreasing the pressure of the refrigerant flowing into the compressor suction 160, the pressure of the refrigerant flowing through the compressor discharge 158 is also decreased. Alternately, the CPR valve 164 can be eliminated if the orifices in the hot gas solenoid valves 150 and 152 are sized to adequately limit refrigeration flow. In this example, the TXV expansion valve 140 is a pressuring limiting TXV expansion valve 140 that regulates the suction pressure of the hopper 122 to regulate the superheat out of the hopper 122.

The system 120 further includes a temperature responsive expansion valve, or a TREV valve 166, to adjust liquid refrigerant injection to the compressor suction 160 to control excessive compressor discharge during the cool cycle. The TREV valve 166 is also self-regulating. A TREV bulb 168 positioned proximate to the compressor discharge 158 to sense the temperature of the compressor discharge 158. In one example, the TREV valve 166 and the TREV bulb 168 are connected by a capillary tube. When the TREV bulb 168 detects that the discharge temperature approaches 230° F., the TREV valve 166 is opened to allow the cool high pressure liquid refrigerant from the condenser 128 to flow into the compressor suction 160, cooling the compressor suction 160 and therefore the compressor discharge 158. Therefore, the compressor 126 discharge temperature can be kept below than 250° F.

A suction solenoid valve 170 proximate to the discharge 188 of the freezing cylinder 124 prevents refrigerant from migrating to the freezing cylinder 124. When the system 120 and the compressor 126 is off, refrigerant tends to migrate to the freezing cylinder 124, which is the coolest part of the system 120, and heat the freezing cylinder 124. When the freezing cylinder 124 is being cooled, the suction solenoid valve 170 is opened to allow refrigerant to discharge from the freezing cylinder 124. By closing this valve 170 When the system 120 is off, the refrigerant is prevented from migrating to and heating the freezing cylinder 124.

During heating, the hot gas solenoid valve 152 is first opened to heat the hopper 122 first. Then hot gas solenoid valve 150 is then opened to heat the freezing cylinder 124. The suction solenoid valve 170 is opened at the same time the hot gas solenoid valve 152 is opened to allow any refrigerant in the freezing cylinder 124 to boil off, preventing the refrigerant from flowing to and slugging the compressor 126. Alternately, the hot gas solenoid valves 150 and 152 and the suction solenoid valves 170 are opened at the same time.

Temperature sensors 172 and 174 monitor the temperature of the freezing cylinder 124 and the hopper 122, respectively. When the system 120 is off and the temperature sensor 174 senses that the temperature of the mix in the hopper 122 is greater than 39° F., the system 120 is turned on and begins the cooling mode to cool the mix in the hopper to 37° F. The freezing cylinder 124 further includes a beater 176. As the temperature of the mix proximate to the door of the freezing cylinder 124 is greatest, the beater 176 is turned on to stir the mix in the freezing cylinder 124 and mix the product to equalize the product temperature. An agitator 178 also mixes the mix in the hopper 122. The agitator 178 is an auto stepping motor assembly mounted to the bottom of the hopper 122 and turns a direct driven blade suspended in the mix.

If the system 120 is turned on to cool the mix in the freezing cylinder 124, the temperature of the mix in the hopper 122 is checked by the temperature sensor 174 prior to shutting the compressor 126 off. If the temperature of the mix in the hopper 122 is detected to be greater than 37° F., the cool refrigerant is sent to the hopper 122 for cooling. Although the temperature of the mix in the hopper 122 has not reached the threshold value of 39° which triggers cooling, the hopper 122 is cooled at this time as it is more efficient to cool the hopper 122 while the system 120 is already operating in cooling mode.

The liquid line solenoid valves 146 and 148, the two hot gas solenoid valves 150 and 152, and the suction solenoid valve 170 are all controlled by the control 186, which is the main control 186 of the system 120. The hot gas bypass valve 154, the hot gas bypass solenoid valve 156, the EPR valve 162, the CPR valve 164, and the TREV valves 166, are all self-regulated. When the control 186 detects that cooling of the hopper 122 and the freezing cylinder 124 is necessary, the control 186 turns on the system 120 and opens the liquid line valves 146 and 148 to cool the mix in the hopper 122 and the freeing cylinder 124. The hopper 122 and the freezing cylinder 124 can be separately cooled depending on system 120 requirements. When the control 186 detects that heat of the hopper 122 and the freezing cylinder 124 is necessary, the control 186 turns on the system 120 and opens the hot gas valves 150 and 152 to heat the mix in the hopper 122 and the freeing cylinder 124. The hopper 122 and the freezing cylinder 124 can be separately heated depending on system 120 requirements.

When the system 120 is in auto mode, the cooling mode is operated as needed when detected by the control 186 to maintain the temperature of the mix in the hopper 122 and the freezing cylinder 122 within the desired ranges. When no frozen product is being drawn from the freezing cylinder 124, the system 120 may be placed in a standby mode. The system 120 enters the stand-by mode either manually or at a programmed time. When the standby mode is activated, the product in the freezing cylinder 124 is allowed to melt. The mix in the freezing cylinder 124 is warmed to the temperature of the mix in the hopper 122, reducing the amount of churning which can ruin the product quality. When frozen product is being drawn from the freezing cylinder 124, a switch is activated and refrigerant is immediately sent to the freezing cylinder 124.

Although an AXV expansion valve 138 and the liquid line solenoid valve 146 have been illustrated and described as expanding and controlling the flow of refrigerant into the inlet of the freezing cylinder 124, other devices can be employed. For example, a stepper driven expansion device can employed, eliminating the liquid line solenoid valve. The stepper driven expansion device can be operated as either an AXV (by adding a pressure transducer to monitor freezing cylinder pressure) or a TXV (by adding a temperature transducer to the temperature outlet) by adjusting refrigerant flow as a function of freezing cylinder pressure or freezing cylinder superheat.

Although one system 120 has been illustrated and described, it is to be understood that more than one system 120 can be employed for different products. For example, two different systems 120 can be employed for two different products, such as soft serve ice cream and shakes. Alternately, multiple flavors of a single type of frozen product can bee employed in a single system 120. Each flavor would utilized a separate hopper 122 and freezer cylinder 124, but would share a compressor 126.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A refrigeration system comprising:
a compression device to compress a refrigerant to a high pressure, said compression device including a compressor suction and a compressor discharge;
a heat rejecting heat exchanger for cooling said refrigerant;
a hopper expansion device for reducing a hopper portion of said refrigerant to a hopper low pressure;
a cylinder expansion device for reducing a cylinder portion of said refrigerant to a cylinder low pressure;
a hopper liquid line valve positioned between said hopper expansion device and said heat rejecting heat exchanger;
a cylinder liquid line valve positioned between said cylinder expansion device and said heat rejecting heat exchanger;
a hopper heat exchanger, said refrigerant from said hopper expansion device exchanging heat with a hopper mix in said hopper heat exchanger; and
a cylinder heat exchanger, said refrigerant from said cylinder expansion device exchanging heat with a cylinder mix in said cylinder heat exchanger.

2. The system as recited in claim 1 wherein said cylinder expansion device is an AXV expansion valve.

3. The system as recited in claim 1 wherein said hopper expansion device is a TXV expansion device.

4. The system as recited in claim 1 further including cylinder hot gas valve positioned between said compressor discharge and said cylinder heat exchanger to control a flow of said refrigerant from said compressor discharge and directly to said cylinder heat exchanger and a hopper hot gas valve positioned between said compressor discharge and said hopper heat exchanger to control a flow of said refrigerant from said compressor discharge and directly to said hopper heat exchanger.

5. The system as recited in claim 4 wherein said cylinder liquid line valve and said hopper liquid line valve are opened and said cylinder hot gas valve and said hopper hot gas valve are closed to allow refrigerant from said heat rejecting heat exchanger to accept heat from said hopper mix in said hopper heat exchanger and said cylinder mix in said cylinder heat exchanger.

6. The system as recited in claim 4 wherein said cylinder liquid line valve and said hopper liquid line valve are closed and said cylinder hot gas valve and said hopper hot gas valve are opened to allow refrigerant from said compressor to reject heat to said hopper mix in said hopper heat exchanger and said cylinder mix in said cylinder heat exchanger.

7. The system as recited in claim 6 wherein said hopper mix and said cylinder mix are heated to above 150° F. for at least 30 minutes.

8. The system as recited in claim 4 further including a hot gas bypass valve positioned between said compressor discharge and said compressor suction, and said hot gas bypass valve is opened to direct said refrigerant from said compressor discharge to said compressor suction when said hopper liquid line valve is opened, said cylinder liquid line valve is closed, said hopper hot gas valve is closed, and said cylinder hot gas valve is closed.

9. The system as recited in claim 8 further including a hot gas bypass valve in series with said hot gas bypass valve and activated in parallel with said hopper liquid line valve, and said hot gas bypass valve is opened when said hopper liquid line valve is opened.

10. The system as recited in claim 4 further including a suction valve positioned proximate to a cylinder heat exchanger discharge of said cylinder heat exchanger, said suction valve is open when said cylinder liquid line valve is open, and said suction valve is closed when said system is inactive to prevent refrigerant from flowing into said cylinder heat exchanger.

11. The system as recited in claim 4 further including a suction valve positioned proximate to a cylinder heat exchanger discharge of said cylinder heat exchanger, said suction valve is opened when said hopper hot gas valve is opened, and said cylinder hot gas valve is opened after said suction valve and said hopper hot gas valve are opened.

12. The system as recited in claim 4 wherein said refrigerant from said compressor discharge of said compressor rejects heat to said cylinder mix in said cylinder heat exchanger and rejects heat to said hopper mix in said hopper heat exchanger.

13. The system as recited in claim 1 further including an evaporator pressure regulator valve positioned proximate to a hopper heat exchanger discharge of said hopper heat exchanger, and said evaporator pressure regulator valve is closed to increase a pressure of said refrigerant in said hopper heat exchanger and to increase a temperature of said refrigerant in said hopper heat exchanger.

14. The system as recited in claim 13, wherein said refrigerant in said hopper heat exchanger is heated to between 22° to 24° F.

15. The system as recited in claim 1 further including a crankcase pressure regulator valve positioned proximate to said compressor suction of said compressor, and said crankcase pressure regulator valve is restricted to reduce a suction pressure of said refrigerant flowing into said compressor suction of said compressor and to reduce a discharge pressure of said refrigerant exiting said compressor discharge of said compressor.

16. The system as recited in claim 1 further including a temperature responsive expansion valve positioned between said heat rejecting heat exchanger and said compressor suction of said compressor.

17. The system as recited in claim 16, further including a temperature responsive expansion valve sensor, and wherein said temperature responsive expansion valve is opened to allow said refrigerant from said heat rejecting heat exchanger to enter said compressor suction of said compressor when said temperature responsive expansion valve sensor senses that a compressor discharge temperature of said refrigerant exiting said compressor discharge is 230° F.

18. The system as recited in claim 16, further including a crankcase pressure regulator valve positioned proximate to said compressor suction of said compressor, and said crankcase pressure regulator valve is restricted to reduce a discharge pressure of said refrigerant exiting said compressor discharge of said compressor, and said system further includes a subcooler, and said refrigerant exiting said heat rejecting heat exchanger exchanges heat with said refrigerant entering said compressor suction of said compressor in said subcooler, and said temperature responsive expansion valve is opened to inject said refrigerant at a point between said crankcase pressure regulator valve and said subcooler.

19. The system as recited in claim 1 further including a cylinder temperature sensor which senses a cylinder temperature of said cylinder mix in said cylinder heat exchanger and a hopper temperature sensor which senses a hopper temperature of said hopper mix in said hopper heat exchanger.

20. The system as recited in claim 19 wherein said hopper liquid line valve is opened when said hopper temperature sensor detects said hopper temperature is grater than 39° F.

21. The system as recited in claim 19 wherein said hopper liquid line valve is closed when said hopper temperature sensor detects said hopper temperature is less than 37° F.

22. The system as recited in claim 1 wherein said hopper heat exchanger is a hopper heat accepting heat exchanger in a cooling mode and a hopper heat rejecting heat exchanger in a heating mode and said cylinder heat exchanger is a cylinder heat accepting heat exchanger in said cooling mode and said cylinder heat exchanger is a cylinder heat rejecting heat exchanger in said heating mode.

23. A refrigeration system comprising:
   a compression device to compress a refrigerant to a high pressure, said compression devise having a compressor suction and a compressor discharge;
   a heat rejecting heat exchanger for cooling said refrigerant;
   a hopper expansion device for reducing a hopper portion of said refrigerant to a hopper low pressure;
   a cylinder expansion device for reducing a cylinder portion of said refrigerant to a cylinder low pressure;
   a hopper heat exchanger, said refrigerant from said hopper expansion device exchanging heat with a hopper mix in said hopper heat exchanger;
   a cylinder heat exchanger, said refrigerant from said cylinder expansion device exchanging heat with a cylinder mix in said cylinder heat exchanger;
   a cylinder liquid line solenoid valve positioned between said cylinder expansion device and said heat rejecting heat exchanger;
   a hopper liquid line solenoid valve positioned between said hopper expansion device and said heat rejecting heat exchanger;
   a cylinder hot gas solenoid valve positioned between said compressor discharge and said cylinder heat exchanger; and
   a hopper hot gas solenoid valve positioned between said compressor discharge and said hopper heat exchanger, wherein said cylinder liquid line solenoid valve and said hopper liquid line solenoid valve are opened and said cylinder hot gas solenoid valve and said hopper hot gas solenoid valve are closed to allow for cooling of said hopper and said cylinder, and said cylinder liquid line solenoid valve and said hopper liquid line solenoid valve are closed and said cylinder hot gas solenoid valve and said hopper hot gas solenoid valve are opened to allow for heating of said hopper and said cylinder.

24. A method of operating a refrigeration system comprising the steps of:
   a) compressing a refrigerant to a high pressure;
   b) cooling said refrigerant;
   c) expanding a first portion of said refrigerant from step b to a hopper low pressure;
   d) controlling a flow of said refrigerant between step b and step d with a hopper liquid line valve;
   e) heating said first portion of said refrigerant in a hopper heat exchanger;
   f) expanding a second portion of said refrigerant from step b to a cylinder low pressure
   g) heating said second portion of said refrigerant; and
   h) controlling a flow of said refrigerant between step b and step g with a cylinder liquid line valve; and
   i) heating said second portion of said refrigerant in a cylinder heat exchanger.

25. The method as recited in claim 24 further including the steps of closing said hopper liquid line valve and said cylinder liquid line valve, and flowing said refrigerant from step a directly to said hopper heat exchanger and said cylinder heat exchanger.

* * * * *